United States Patent [19]
Rodriguez et al.

[11] Patent Number: 6,016,163
[45] Date of Patent: Jan. 18, 2000

[54] METHODS AND APPARATUS FOR COMPARING BLOCKS OF PIXELS

[75] Inventors: Arturo A. Rodriguez, Norcross; Neilesh R. Patel, Duluth; Timothy W. Simerly, Cummings, all of Ga.

[73] Assignee: Scientific-Atlanta, Inc., Norcross, Ga.

[21] Appl. No.: 08/815,259

[22] Filed: Mar. 12, 1997

[51] Int. Cl.[7] .............................. H04N 7/12; H04N 11/02; H04N 11/04
[52] U.S. Cl. .......................... 348/420; 348/416; 348/413
[58] Field of Search ................................ 348/420, 421, 348/422, 425, 403, 407, 413, 416, 699; H04N 7/12, 11/02, 11/09

[56] References Cited

U.S. PATENT DOCUMENTS

| | | | |
|---|---|---|---|
| 5,210,605 | 5/1993 | Zaccarin et al. | 358/105 |
| 5,420,809 | 5/1995 | Read et al. | 364/715.01 |
| 5,428,403 | 6/1995 | Andrew et al. | |
| 5,430,886 | 7/1995 | Furtek | 395/800 |
| 5,561,475 | 10/1996 | Jung | 348/699 |
| 5,610,658 | 3/1997 | Uchida et al. | 348/416 |
| 5,652,625 | 7/1997 | Chen et al. | 348/416 |
| 5,731,850 | 3/1998 | Maturi et al. | 348/699 |
| 5,740,340 | 4/1998 | Purcell et al. | 395/118 |
| 5,796,855 | 8/1998 | Lee | 348/699 |

OTHER PUBLICATIONS

Junavit Chalidabhongse, Sungook Kim, C.–C. Jay Kuo, Fast Motion Vector Estimation for Video Coding Based on Multiresolution–Spatio–Temporal Correlations, Visual Communications and Image Processing '96, SPIE–The International Society for Optical Engineering Proceedings, vol. 2727.

*Primary Examiner*—Howard Britton
*Assistant Examiner*—Nhon T. Diep
*Attorney, Agent, or Firm*—Kenneth M. Massaroni; Hubert J. Barnhardt III; Kelly A. Gardner

[57] ABSTRACT

Techniques for comparing blocks of pixels in digital image encoding. The techniques apply a pattern of elements containing contiguous pixels to the blocks being compared, and only the pixels in the elements are compared. The pixels are contiguous in the horizontal dimension of the digital image, which ensures that the block matching process is sensitive to small-scale vertical features of the image. A version of the technique which is particularly advantageous for use with DSPs that can process the pixels in a word in parallel uses checkerboard patterns in which each element is a word. Variations on the patterns take into account the fact that the block of pixels being compared may be word-aligned, misaligned by one pixel, misaligned by two pixels, and misaligned by three pixels. Misalignment may be dealt with by not comparing pixels that do not belong to the blocks being compared or by using an aligned pattern which does not completely cover the block and adding elements in the portion covered by the pattern to compensate for the elements that are not covered.

19 Claims, 9 Drawing Sheets

2 - PIXEL MISALIGNED PATTERN 601

3 - PIXEL MISALIGNED PATTERN 701

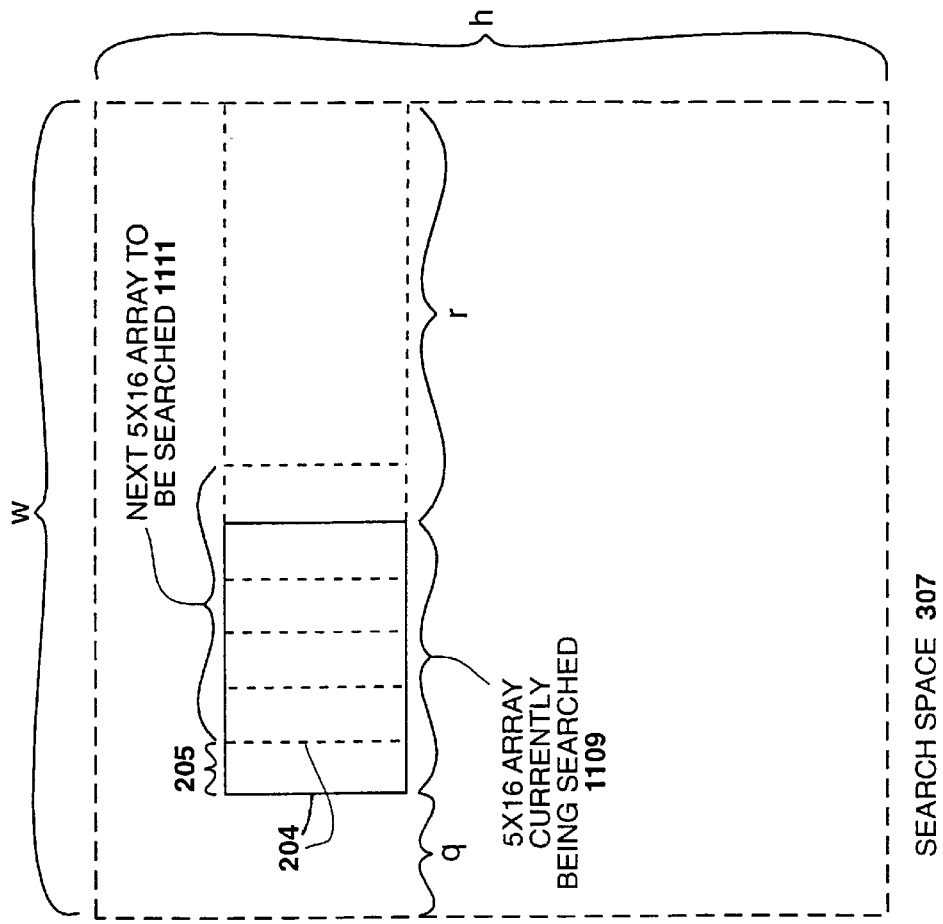
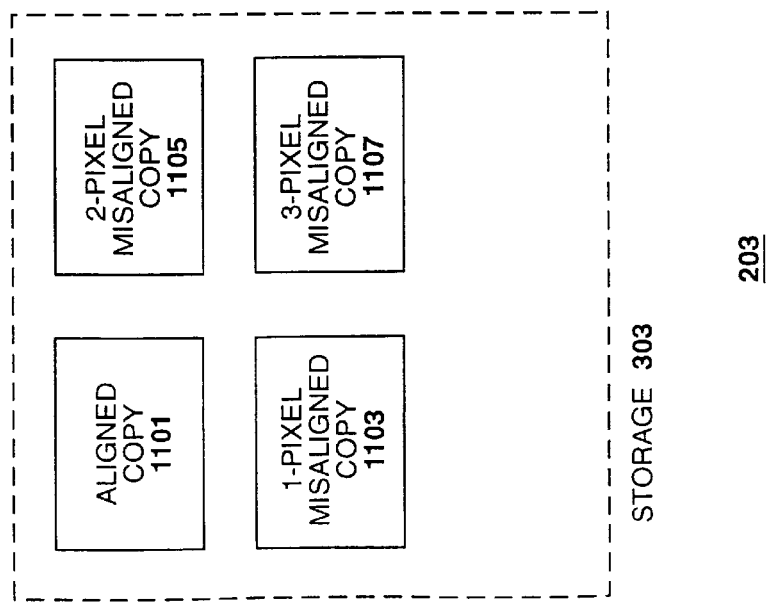
FIG - 11

METHODS AND APPARATUS FOR COMPARING BLOCKS OF PIXELS

BACKGROUND OF THE INVENTION

1. Field of the Invention

The invention concerns the digital representation of images generally and more specifically concerns the techniques used to compress digital representations of images before transferring them via a medium with limited bandwidth.

2. Description of Related Art

Digital images are originally represented in the memory of a computer system as arrays of picture elements or pixels. Each pixel represents a single point in the image. The pixel itself is an item of data, and the contents of the item of data determine how the point represented by the pixel will appear in the digital image. The quality of a digital image of course depends on the number of pixels in the image and the size of the pixels; generally, the more pixels there are in the image and the larger the item of data representing each pixel is, the better the image.

Because this is the case, the arrays of pixels used to originally represent high-quality digital images are very large and require large amounts of memory. The size of the arrays is particularly troublesome when the digital images in question are part of a sequence of images that when seen in the proper order and with the proper timing make a moving image. The apparatus that is displaying the sequence of images must be able not only to store them but also to read and display them quickly enough so that the timing requirements for the moving images are met.

The problems of timing and storage are particularly severe where the sequence of digital images is distributed by means of a medium with limited bandwidth to a receiver with limited storage. Examples where this is the case are digital television, videoconferencing, or videotelephony. In these applications, the sequence of images must be transmitted by means of a broadcast or cable television channel or a telephone line to a relatively low-cost consumer device such as a television set, video telephone, or personal computer with limited amounts of memory to store the images. These applications are consequently economically practical only if some way is found to compress the digital images and thereby to reduce the bandwidth required to transmit the images and/or the storage required to store them at their destinations.

The art has developed many different techniques for compressing sequences of digital images. One example of these techniques is the MPEG-2 standard for compressing digital video, described in *Background Information on MPEG-1 and MPEG-2 Television Compression,* which could be found in November 1996 at the URL http://www.cdrevolution.com/text/mpeginfo.htm. All of these techniques take advantage of the fact that a sequence of digital images contains a great deal of redundant information. One type of redundancy is spatial: in any image, there is liable to be a high degree of similarity among pixels in a given small area of the image. Since that is the case, it is often possible to describe an area in an image by means of a pattern consisting of some small number of pixels and a description of the shape of the area that contains the pattern. Further, where a given area of the image strongly resembles another area of the image but is not identical to the other area, it is possible to replace the pixels in the given area with a representation that describes the given area in terms of the difference between it and the given area.

The other type of redundancy in a sequence of images is temporal; very often, a given image in the sequence is very similar in appearance to an earlier or later image in the sequence; it is consequently possible to compress the given image by making a representation of the given image that represents the difference between the given image and the earlier or later image, termed herein the reference image, and using this representation in place of the representation as an array of pixels.

One way of expressing the difference between the given image and the reference image is shown in FIG. 1. Digital given image 101 is represented in memory as an array of pixels 105. The image is further divided into blocks 103, each of which is typically 16 pixels square. An object 107 in given image 101 is contained in four adjacent blocks 103: blocks 103(m,n), (m+1,n), (m,n+1), and (m+1,n+1). In given image 109, object 107 is in a different position, namely blocks 103(b,s), (b+1,s), (b,s+1), and (b+1,s+1), but object 107 otherwise has substantially the same appearance as in given image 101. Since that is the case, object 107 can be described in the compressed representation of given image 101 in terms of its differences from object 107 in reference image 109. There are two kinds of differences:

the change of location of object 107 in given image 101, and any change of appearance of object 107 in given image 101.

The first kind of difference can be described in terms of an offset of object 107 in given image 101 from its position in reference image 109. The second kind can be described in terms of the difference between the appearance of object 107 in given image 101 and the appearance of object 107 in reference image 109.

The use of compression techniques such as the ones just described permit the creation of compressed representations of sequences of digital images which are small enough to satisfy the bandwidth and memory constraints typical of commercial digital television, digital teleconferencing, and digital videotelephony. The production of a compressed representation of a digital image from a pixel representation of the digital image is termed herein encoding the image. The image presently being encoded is termed in the following the current image. Image encoding requires large amounts of computation. The reason for this is that both the compression techniques described above require that blocks 103 of pixels be compared with each other. In the latter technique in particular, it is necessary to locate blocks of the reference image that are similar to blocks of the current image, and a search for such a block may potentially involve comparing all of the blocks of the reference image with a given block of the current image. Depending on the application, the similarity of the blocks being compared is measured by either of two formulas, the Sum of Pixel Absolute Errors (SAE) and the Sum of the Squared Pixel Errors (SSE). It is noted that the words Error and Differences are used with equivalent meaning within the same context by those skilled in the art. Hence, SAD and SAE refer to the same block matching computation. Likewise, SSD and SSE are equivalent. Where what are being compared are 16-pixel square blocks 103, SSE is defined for each (u, v) offset of the position of the block in the reference image from the block in the current image:

$$SSE(u, v) = \sum_{i=1}^{16} \sum_{j=1}^{16} [P_{curr}(i, j) - P_{ref}(i+u, j+v)]^2$$

where $P_{curr}$ is the block being predicted using motion estimation in the current picture and $P_{ref}$ is a candidate block in the search space in the reference picture displaced from $P_{curr}$ by the vector (u, v).

For a comparison of 16 by 16 pixel blocks, SAE is defined for each (u, v) offset in the search space as:

$$SAE(u, v) = \sum_{i=1}^{16} \sum_{j=1}^{16} |P_{curr}(i, j) - P_{ref}(i+u, j+v)|$$

A comparison of two 16-pixel blocks using SSE would require 256 subtractions, 256 squaring operations (i.e., multiplies), and 255 additions for each considered candidate block predictor. SAE replaces the multiply operation with an absolute value operation.

The process of searching for blocks in the reference image that are similar to blocks in the current image is termed herein motion estimation, and as will be immediately apparent from the foregoing, motion estimation requires enormous numbers of block comparisons.

Three different classes of methods are known for reducing the number of comparisons. Two of them are directed to reducing the number of blocks that must be compared; the third is directed to reducing the number of pixels within the block that must be compared.

1. Methods that reduce the number of candidate blocks in the search space that are considered as predictors by using heuristics. Examples of such methods are the Logarithmic Search and the Three-step Search methods, explained in K. R. Rao and J. J. Hwang, *Techniques and Standards for Image, Video, and Audio Coding,* Prentice-Hall Press 1996.
2. Hierarchical search methods that simultaneously reduce the number of pixels in the computation of the block matching criterion and the number of considered block predictors, are also explained in the Rao reference supra. These methods generate successive lower resolution of the current and reference pictures by decimating or low-pass filtering by a factor of two in both the horizontal and vertical. Block matching is performed at the smallest available resolution and the results are mapped to the next higher resolution where a limited number of block candidates are considered at displacements localized around the mapped best match.
3. A method that reduces the number of operations required to compute the block matching criteria by comparing only one quarter of the pixels in the block. The method divides the 16×16 block into 64 2×2 sub blocks and compares only a single pixel in every 2×2 sub-block. The method alternates the pixel being compared between the northwest, northeast, southwest, and southeast pixel in the sub-block at different block predictor offsets. The method is described in detail in B. Liu and A. Zaccarin, "New Fast Algorithms for the Estimation of Block Motion Vectors", *IEE Transactions on Circuits and Systems for Video Technology,* vol. 3, no. 2, 1993.

The first two methods only address the problem of reducing the number of blocks to be compared, not the problem of reducing the computational cost of the block comparison itself. The third method in fact does reduce the number of comparisons made, but has disadvantages. First, because it does not compare adjacent pixels, it does not take advantage of the parallel processing capabilities of many modern microprocessors. Second, the choice of pixels to be compared does not take into account the fact that the human eye is far more sensitive to vertically-aligned detail than it is to detail with other orientations. Because this is so, particular attention must be paid to vertically-aligned detail in block comparison. It is an object of the present invention to provide improved techniques for comparing blocks of pixels which reduce the number of comparisons made in a block and which at the same time preserve vertical detail, are well adapted to use in the processor of a computer system, and can take advantage of whatever parallel processing capabilities the processor may have. Since the invention is directed to comparing blocks efficiently rather than to selecting the blocks to be compared, the technique can be employed to do block comparison in either of the first two methods described above.

SUMMARY OF THE INVENTION

The techniques of the invention attain the foregoing objectives by comparing only those pixels in the blocks being compared which belong to a pattern of pixels that includes first elements in which two or more contiguous pixels are to be compared and second elements in which no pixels are to be compared. The contiguous pixels are contiguous in a horizontal direction of the images to which the blocks being compared belong, and the techniques consequently preserve vertical detail. Moreover, because the pixels are contiguous, the comparison may be done in parallel. The pattern may include pixels from blocks adjacent to the blocks being compared, and when that is the case, only pixels that are part of the blocks are compared. The pattern may also cover fewer than all of the pixels in the block, and when that is the case, extra elements are added to the pattern to make up for the pixels that are not covered by the pattern. In a preferred embodiment, the pattern is a checkerboard arrangement, with the elements of the pattern being word-aligned.

Other objects and advantages of the invention will be apparent to those skilled in the arts to which the invention pertains upon perusing the following Detailed Description and Drawing, wherein:

BRIEF DESCRIPTION OF THE DRAWING

FIG. 11 is a diagram showing memory when search techniques using the patterns are being employed.

Figure 1:
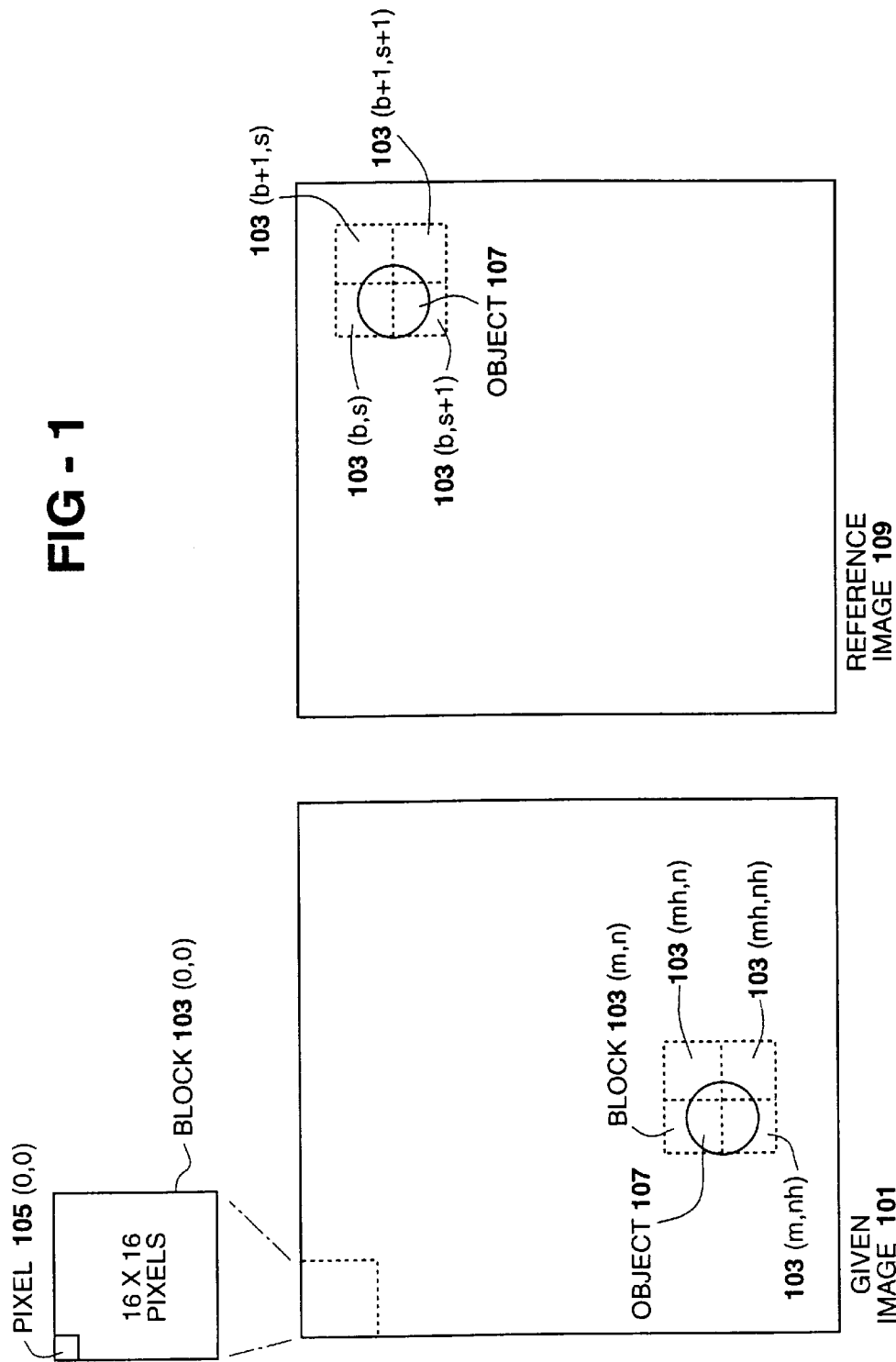
FIG. 1 is a diagram showing digital image components and encoding techniques.

The reference numbers in the drawings have at least three digits. The two rightmost digits are reference numbers within a figure; the digits to the left of those digits are the number of the figure in which the item identified by the reference number first appears. For example, an item with reference number 203 first appears in FIG. 2.

DETAILED DESCRIPTION

As explained above, the invention provides block comparison techniques which take advantage of certain characteristics of processors to reduce the time cost of making block comparisons. The processors employed in the preferred embodiment are digital signal processors or DSPs, that is, microprocessors which have been optimized to perform the computations required to process digitized signals and to encode and decode digitized representations of analog signals. The particular DSP employed in the preferred embodiment is a TMS320C80, manufactured by Texas Instruments Incorporated, Dallas, Tex. The characteristics which make the TMS320C80 particularly adapted for use in embodiments of the invention are the following:

a 32-bit wide data bus connecting the DSP to a data random access memory (RAM);
32-bit wide registers in the DSP; and
an ALU in the DSP which can perform an operation on all four bytes of a 32-bit wide register in parallel.

As will become apparent in the following, the invention may be implemented in one of its aspects using any kind of processor; in another of its aspects, it may be implemented using any processor which is able to perform operations in parallel on portions of the contents of a data register in parallel.

Figure 2:
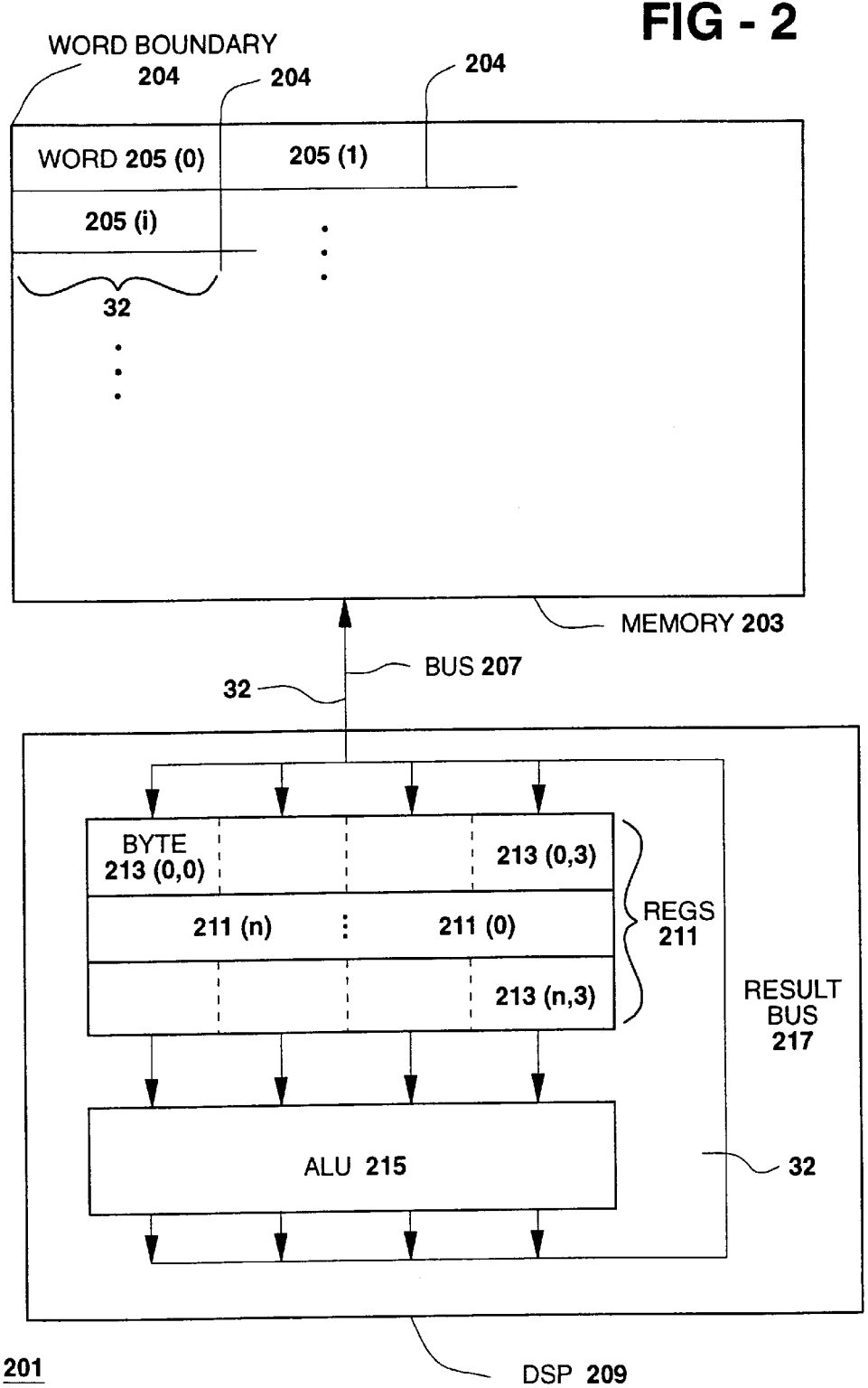
FIG. 2 is a block diagram of a processor and memory of the type employed in an embodiment of the invention.

FIG. 2 shows a processor and memory system 201 which may be used to implement the invention. System 201 has a DSP 209 that has the above characteristics of the TMS320C80, a memory 203 which is divided into 32-bit words 205, and a 32-bit bus 207 which connects memory 203 and DSP 209. Beginning with memory 203, in memory 203, data is fetched along word boundaries 204; that is, the locations specified by addresses in memory 203 begin at word boundaries 204 and all reads are done on word boundaries. Word as used herein is thus to be understood as a unit of data which may be fetched from memory in a single operation.

Continuing with DSP 209, the features which are presently of interest in DSP 209 are internal registers 211, a set of 32-bit internal registers 211(0 ... n) which can receive 32 bits from and output 32 bits to bus 207, and ALU 215. Each internal register 211(i) is further subdivided into 4 8-bit bytes 213(0 ... 3). ALU 215 is moreover so constructed that it can perform an operation on all of the bytes 213 in a word in parallel. The results of these operations are then output via result bus 217 to a register in registers 211. As an example of how these capabilities can interact to perform an operation of interest in the context of block comparison, DSP 209 can fetch one word from memory 203 to a register 211(i) in one operation, fetch another word from memory 203 to a register 211(j) in one operation, and can subtract each byte 213 of register 211(i) from the corresponding byte 213 of register 211(j) in parallel in a single operation.

Figure 3:
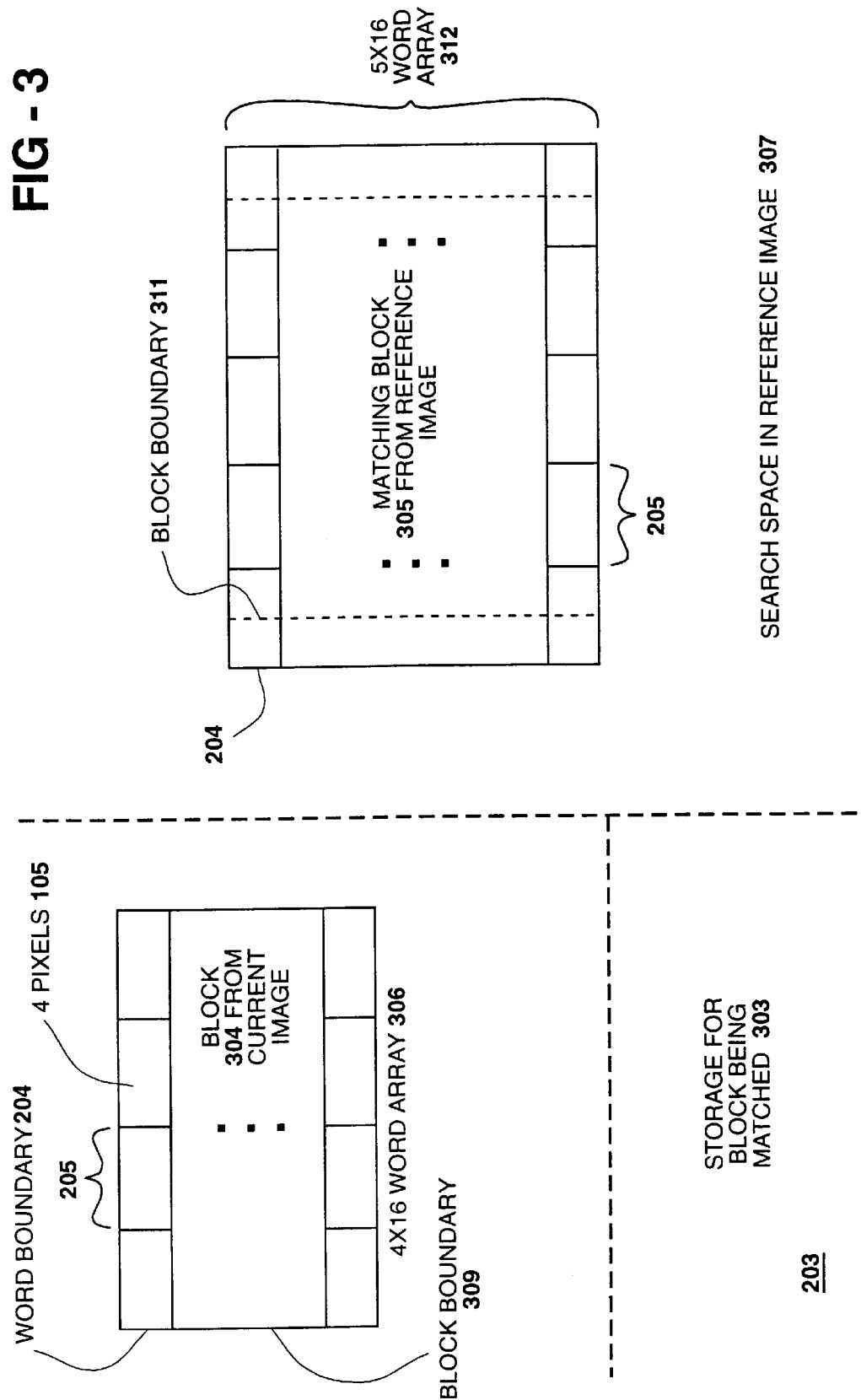
FIG. 3 is a diagram showing data structures in memory when a block compare operation is being performed.

FIG. 3 shows how DSP 209's ability to perform operations on four bytes at once can be used to advantage in making block comparisons. FIG. 3 shows a portion of memory 203 when DSP 209 is being used to make block comparison. One part 303 of this portion of memory 203 contains the pixels of block 304 from current image 101 for which matching blocks are being searched in the reference image 109. The other contains a search space 307 of pixels from a portion of the reference image. Each byte contains one pixel of data, and consequently, a word 205 in memory 203 contains 4 pixels 105 and a 16×16 block 103 of pixels is contained in a minimum of 64 32-bit words 205. Two cases are possible here. Block 304 in FIG. 3 shows the first. Here, block boundary 309 is made up of word boundaries 204; the block is said to be word aligned and the entire block is contained in a 4×16 array 306 of words 205. It is, however, perfectly possible, that the block 305 which best matches block 304 is not word aligned, that is, that block 305's block boundary 311 falls on a byte boundary that is not a word boundary. If the byte boundary is the beginning of the second byte in the word, block 305 is said to be one-pixel misaligned; if the byte boundary is the beginning of the third byte, the block is said to be two-pixel misaligned; if the boundary is the beginning of the fourth byte, the block is said to be three-pixel misaligned. In the case of the misaligned blocks, the entire block is contained in a 5×16 array 312 of words 205, with some of the bytes in the words in the first and last columns of the array belonging to the preceding and following blocks 305.

When block 304 and the block 105 in search space 307 being compared with it are both aligned, DSP 209 operates in parallel on the pixels of the corresponding words of 4×16 array 306 and the corresponding 4×16 array in search space 307. The operations can thus be done four times as fast as with processors that are not capable of operating in parallel on subcomponents of words. As will be explained in more detail later, when the block 305 being compared with block 304 is not aligned, a copy of block 304 is used for the comparison that has the same misalignment as the block being compared. The copy is of course contained in a 5×16 array of words. In this case, DSP 209 operates in parallel on the pixels of the corresponding words of the 5×16 arrays 312. The results of operations on pixels that belong to adjacent blocks 305 are simply disregarded in the further computations.

Comparing fewer than all of the Words in the Block: FIGS. 4–10

While the ability of DSP 209 to do operations on the pixels of a word in parallel already offers a substantial increase in the speed of computation (4 times in the case of word-aligned blocks), a further increase in efficiency can be achieved by comparing fewer than all of the words in the block. This technique works because comparing all the pixels in two words detects small-scale features, while large-scale features can be detected without comparing every word. Consequently, if a pattern of words is selected which tends to distribute the words whose pixels are being compared evenly across the blocks being compared, comparisons that are sufficiently accurate for motion estimation purposes may be made even though far fewer than all of the pixels in the block are compared with each other. Moreover, if the pattern of words is selected such that the pixels in the words are in horizontal or raster scan order with regard to the image the pixels are taken from, the technique preferentially detects similarities in small-scale vertical features.

Figure 4:
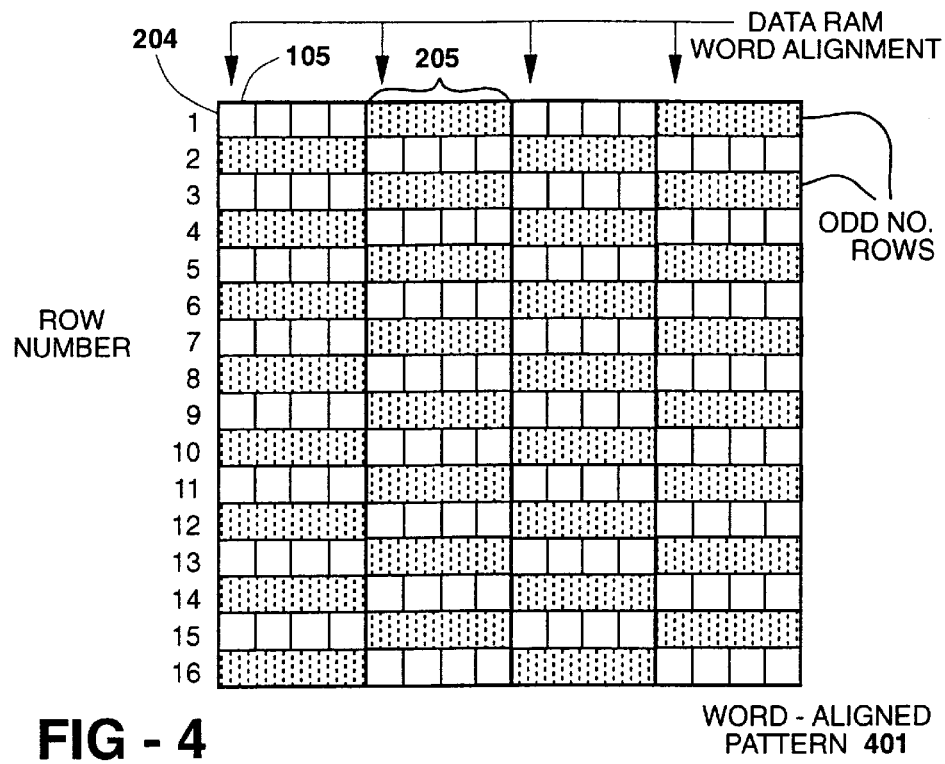
FIG. 4 is a diagram showing a sub-sampling pattern used when the blocks being compared are word-aligned.

In the following, a number of patterns of words containing pixels in raster-scan order are presented that have been found to be particularly effective; while the same underlying notion is applied in all of the patterns, the particular pattern used depends on whether the blocks being compared are aligned or misaligned and if misaligned, on the degree of misalignment. FIG. 4 shows the pattern 401 used in a preferred embodiment when the blocks being compared are aligned. The pattern is a checkerboard, with every other word in each row and each column being compared. More formally, supposing that the processor can process the pixels in a word containing n pixels in parallel and assuming 16×16 blocks and n=4, the block matching criteria is computed on odd-numbered rows on alternating sets of four adjacent pixels, each an 8-bit value. On even-numbered rows, the first set of four adjacent pixels is skipped and the block matching criteria is computed on alternating sets of four pixels. Because this method computes the block matching criteria on sets of adjacent pixels, it is less likely to overlook small features (such as one-pixel wide features).

Figure 5:
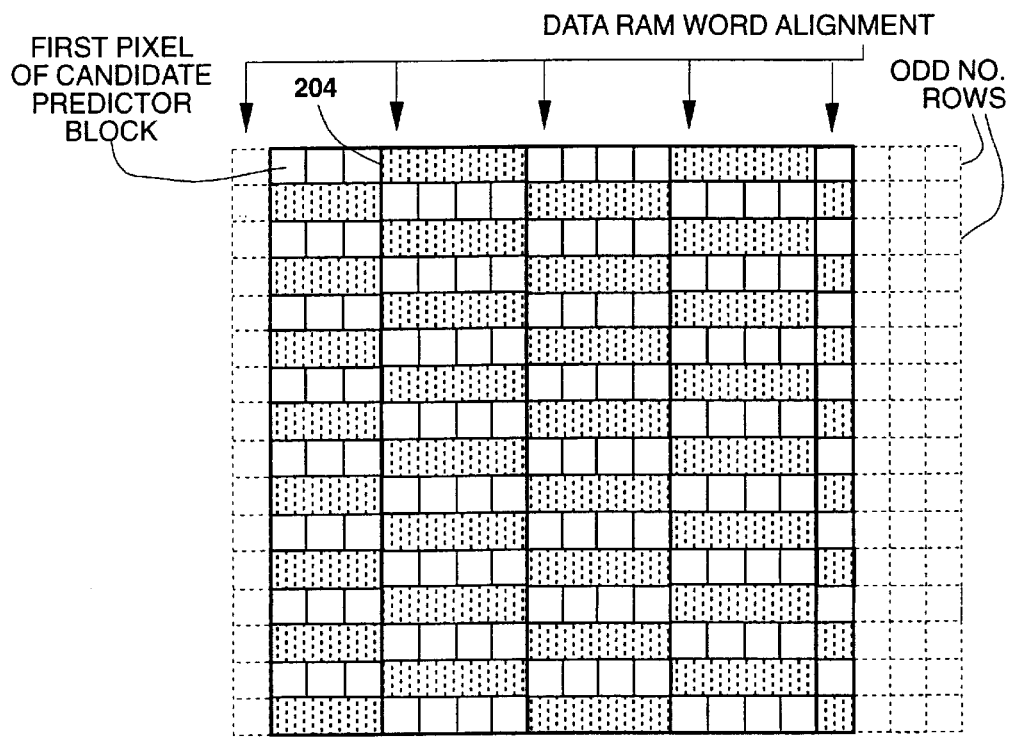
FIG. 5 is a diagram showing a sub-sampling pattern used when the blocks being compared are one-pixel misaligned.
Figure 6:
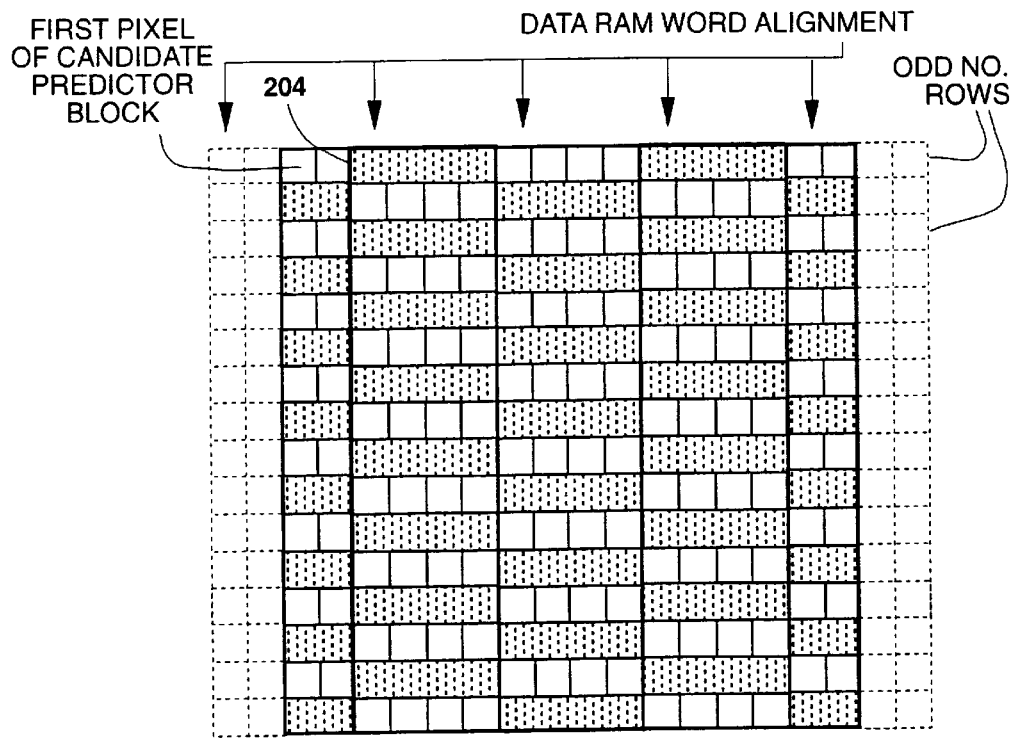
FIG. 6 is a diagram showing a sub-sampling pattern used when the blocks being compared are two-pixel misaligned.
Figure 7:
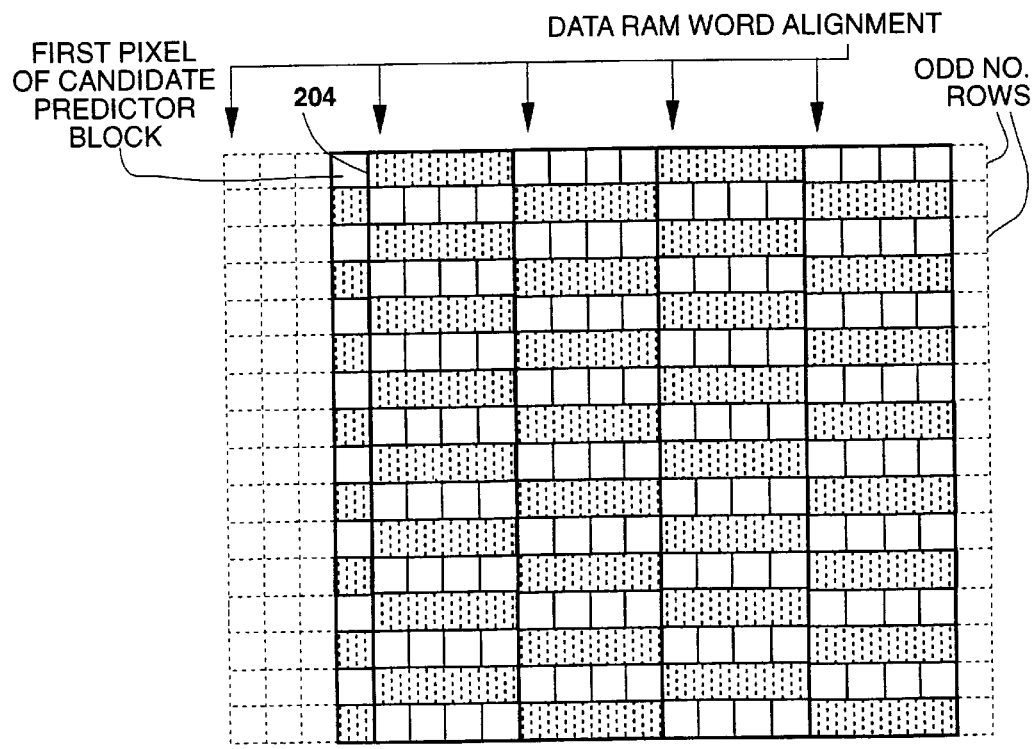
FIG. 7 is a diagram showing a sub-sampling pattern used when the blocks being compared are three-pixel misaligned.

With misaligned blocks, the same checkerboard pattern is employed, but the fact that some pixels being compared do not belong to the blocks being compared is taken into account. One way of doing this is to apply the checkerboard pattern to the 5×16 array described above and ignore the results of comparisons of bytes which are not part of the blocks being compared. FIG. 5 shows a pattern 501 which may be applied to a 5×16 word array that contains a block which is misaligned by one pixel. FIG. 6 shows a pattern 601 which may be applied to a 5×16 word array that contains a block that is misaligned by two pixels. FIG. 7, finally, shows a pattern 701 which may be applied to a 5×16 word array that contains a block that is misaligned by three pixels.

Figure 8:
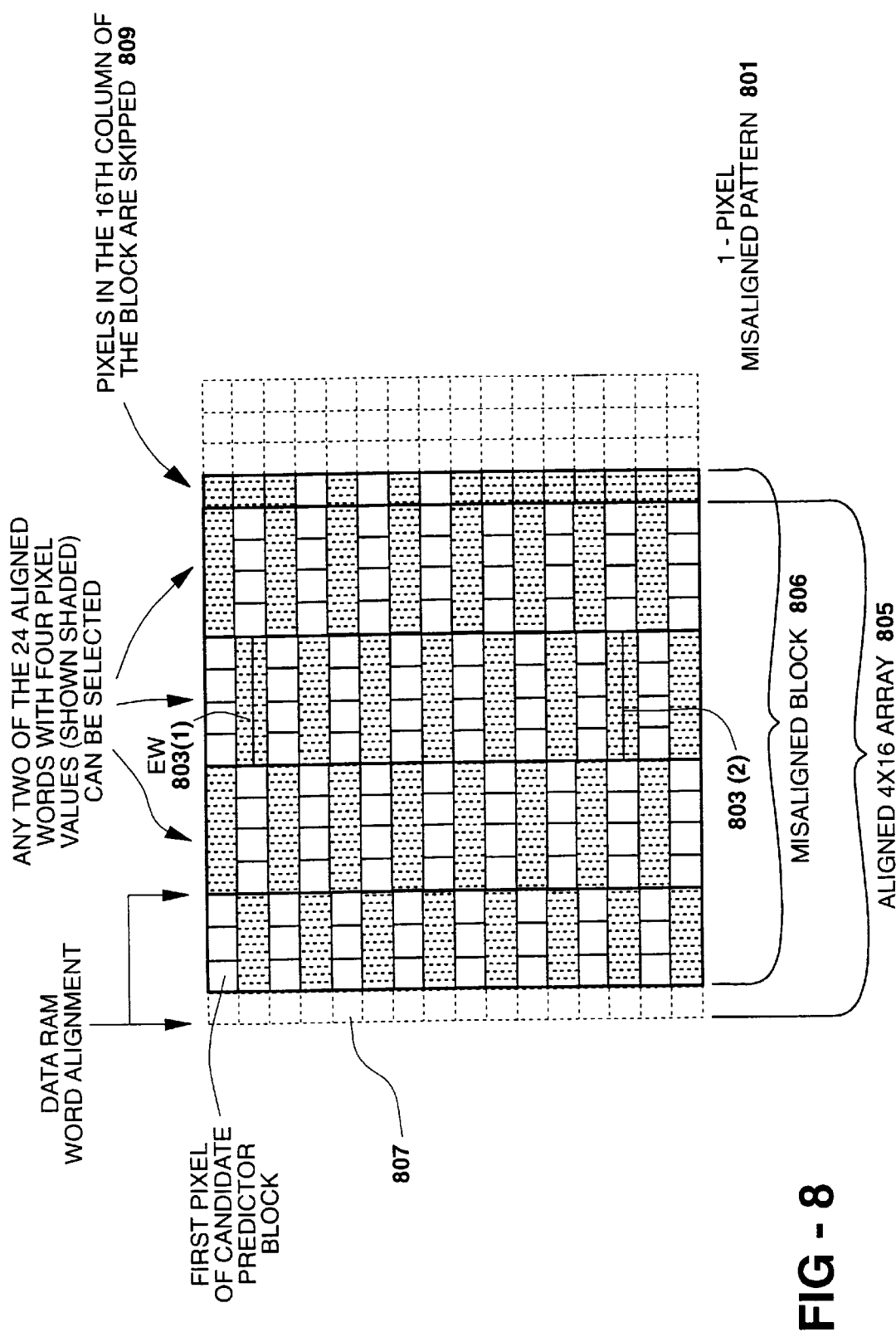
FIG. 8 is a diagram showing an alternate sub-sampling pattern used when the blocks being compared are one-pixel misaligned.
Figure 9:
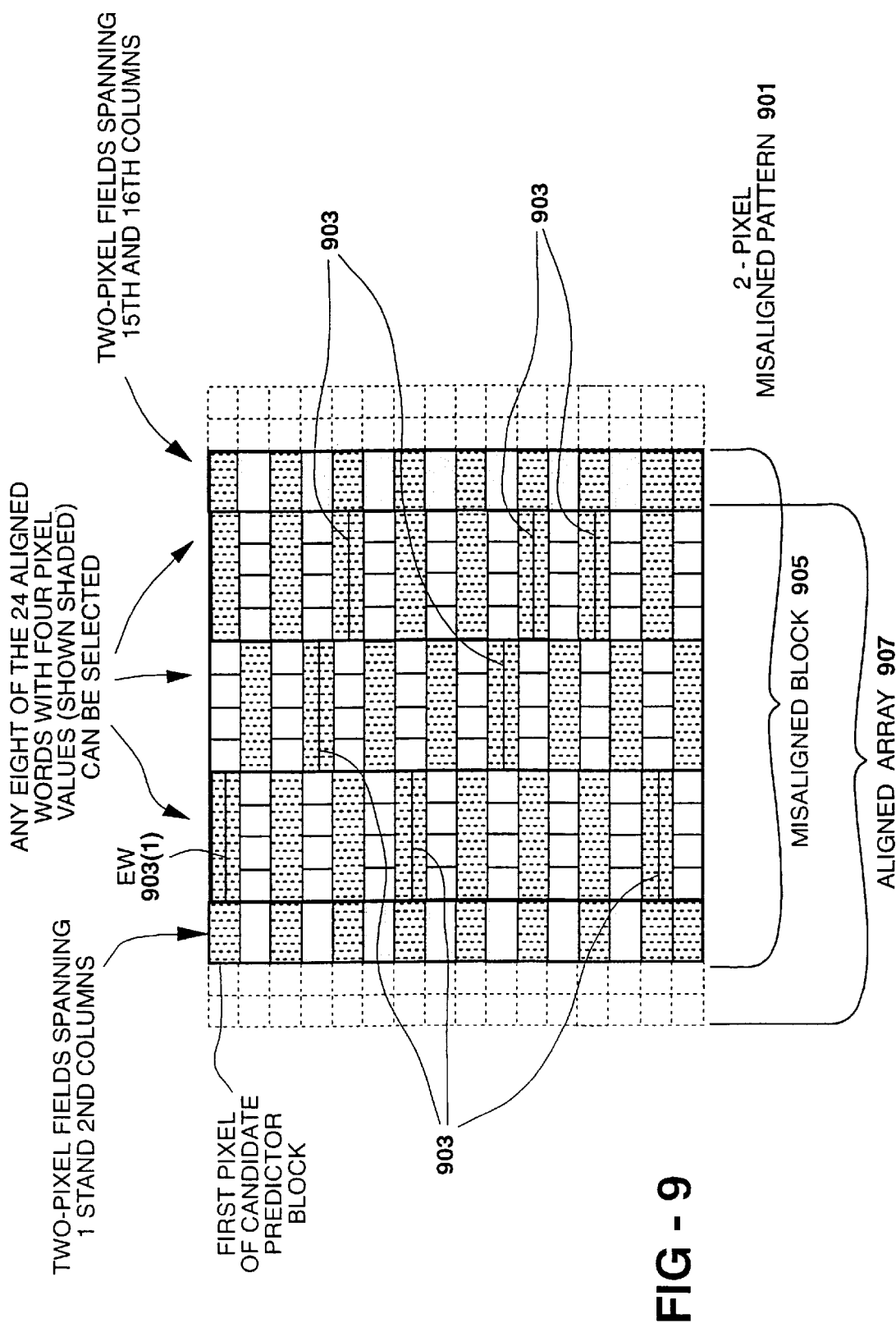
FIG. 9 is a diagram showing an alternate sub-sampling pattern used when the blocks being compared are two-pixel misaligned.
Figure 10:
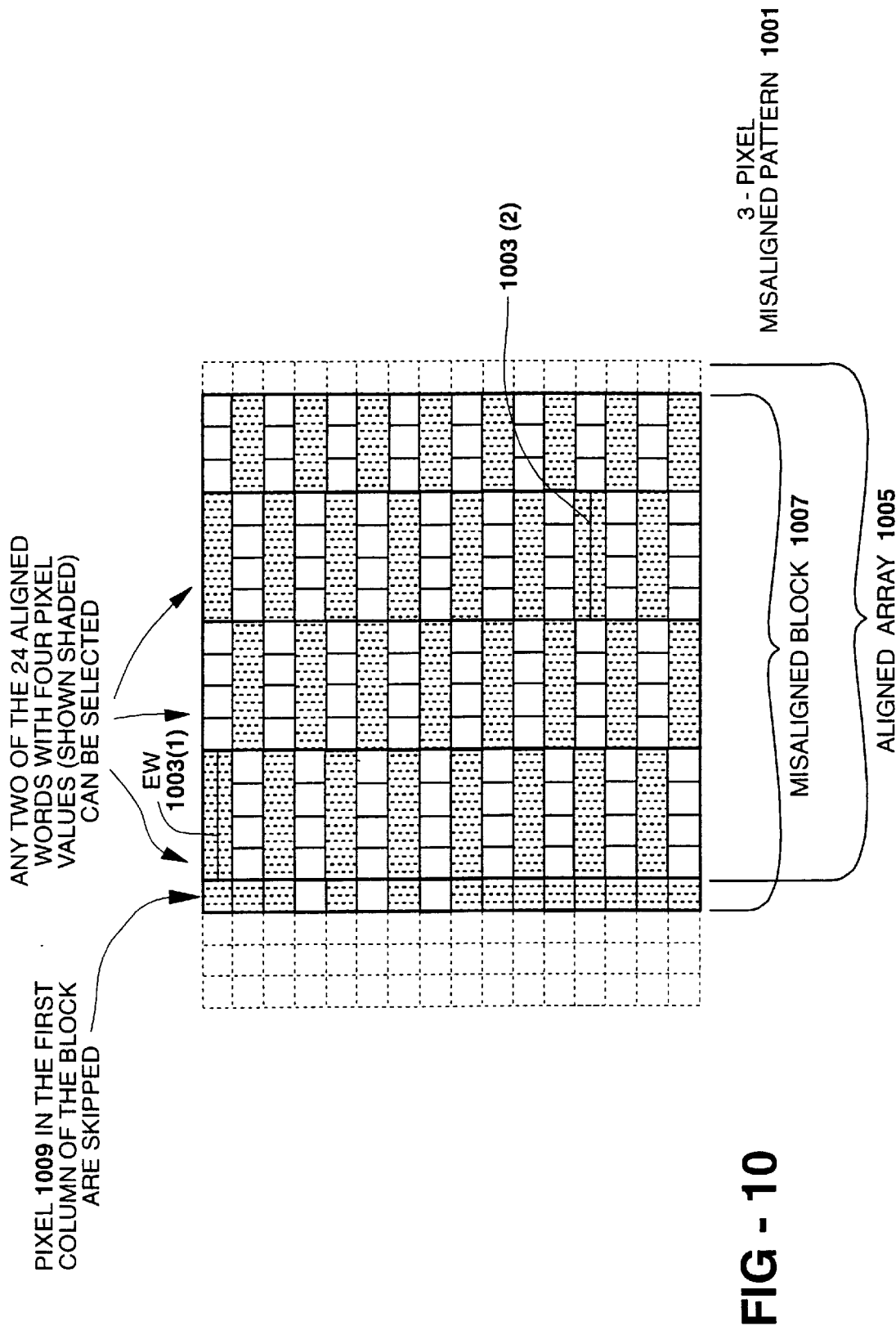
FIG. 10 is a diagram showing an alternate sub-sampling pattern used when the blocks being compared are three-pixel misaligned.

An alternative set of patterns for dealing with misaligned blocks is shown in FIGS. 8–10. The idea here is that only aligned 4×16 arrays of words are compared, and that aligned words in the 4×16 array that otherwise would not be compared are compared to make up for the bits of the misaligned block that are not contained in the aligned 4×16 array. FIG. 8 shows how this works for one-pixel misaligned blocks 305. All of the words to be compared are in aligned array 805; since block 806 is one-pixel misaligned, the first byte of each of the words in the first column of the aligned 4×16 array is not part of block 806, as shown at 807, and as shown at 809, the first byte of each of the words in the column following the fourth column of array 805 is part of block 806. When the checkerboard pattern 501 is taken into account, there are eight pixels in column of pixels 809 which should be involved when block 806 is compared with another block 305. To make up for the lack of these eight pixels, two extra words 803(1) and (2) are selected from among the words in aligned 4×16 array 805 that would otherwise not be compared and the comparison includes these words. Preferably, one of the two words is in the top half of array 805 and the other in the bottom half, as shown in FIG. 8. When the comparison is done for words in the first column, the results of the operation on the first pixel in the column are ignored, and when the remaining words in array 805 are compared, the two extra words 803 are compared as well.

FIG. 9 shows pattern 901 that results when the principle just described is applied to a two-pixel misaligned block; here, there are 32 pixels that belong to misaligned block 905 but not to aligned array 907, and if the checkerboard pattern 601 is applied to these pixels, there are 32 pixels that should be part of the comparison but are not. To make up for these 32 pixels, 8 extra words 903 are selected in aligned array 907, with one extra word preferably being selected in each two-row section of aligned array 907, and are used in the comparison. FIG. 10 shows pattern 1001 that results with a three-pixel misaligned block 1007. Here the skipped pixels 1009 precede aligned array 1005, but the situation is otherwise the same as with a one-pixel misaligned block, and similarly, two extra words 1003 must be selected from the words in aligned array 1005 for the comparison.

Searching for Similar Blocks: FIG. 11

FIG. 11 shows how DSP 209 can be used to search space 307 for blocks 305 in a reference image which match a block 304 from the current image. Before beginning the search, DSP 209 makes four copies of block 304 in storage 303. The first of these is a word-aligned copy 1101; the other three copies are a 1-pixel misaligned copy 1103, a two-pixel misaligned copy 1105, and a 3-pixel misaligned copy 1107. The misaligned copies are of course contained in arrays of 5×16 words.

DSP 209 then begins the search in a corner of search space 307. Search space 307 has a width w and a height h. In search space 307, it is presumed that the search has reached 5×16 array 1109, which is located r words from the end of search space 307 and q words from the left of search space 307. Array 1109 is of course word aligned.

Assuming at first that every pixel in block 304 is being compared with a pixel in array 1109, DSP 209 copies the first word in the first row of aligned copy 1101 of block 304 into a register 211(i) and the first word in the first row of array 1109 into a register 211(j) and performs the subtraction operation required for the comparison on all of the pixels in parallel. DSP 209 does the same for the next three words of the first row of aligned copy 1101 and the corresponding words of array 1109; then DSP 209 uses h, w, r, and q to compute the address of the first word in the second row of array 1109 and compares the words in the second row of aligned copy 1101 with the words in the second row of array 1109. This continues until each word in aligned copy 1101 has been compared with the corresponding word in the first four columns of array 1109.

Next, DSP 209 compares block 304 with the block which begins with the second pixel in the first column of array 1109. It makes the comparison using 1-pixel misaligned copy 1103 of block 304. This time, every word in the 5×16 array containing copy 1101 is compared with every word in array 1109; the results for comparison of pixels that are not contained in block 304 and in the block that begins with the second pixel in the first column of array 1109 are ignored. DSP 209 then proceeds as just described to compare block 304 with the block beginning with the third pixel in the first column of array 1109, using 2-pixel misaligned copy 1105 of block 304 to do this, and finally to compare block 304 with the block beginning with the fourth pixel in the first column of array 1109, using 3-pixel misaligned copy 1107. Having done this, DSP 209 starts the whole process over again with next 5×16 array to be searched 1111, whose first column is the second column of array 1109. DSP 209 continues thus until it has compared block 304 with all of the blocks 305 which can be located in search space 307. It should be noted here that search space 307 need not be a contiguous area of memory, as shown in FIG. 11, but could simply be a collection of "interesting" non-contiguous areas of memory which had been located using methods for reducing the number of blocks to be compared like those discussed in the Description of Related Art. It will be immediately apparent that the technique just described can also be used with the patterns of FIGS. 4–10. In those cases, only those words of block 304 and the block in search space 307 that were specified by the relevant pattern would be compared.

Using patterns 401–701, for the word aligned case, the block matching criteria is computed on four accessed words 205 for every pair of rows. In all three misaligned word cases, the block matching criteria is computed on five accessed words 205 for every pair of rows. Hence, in both, the aligned and misaligned cases, the speed improvement is a factor of 2× over parallel comparisons of pixels that do not use the patterns. That is, for a 16×16 block as is the case in all existing video coding standards, for word-aligned candidate block predictors, the number of accessed words is 32 rather than 64 and the number of subtraction operations is also 32 rather than 64. Likewise, for misaligned candidate predictor blocks, the computation speed improvement is 2× as 40 rather than 80 words are accessed and the number of subtractions is also 40 rather than 80.

Using patterns 801 and 1001 for one-pixel and three-pixel misaligned blocks 305 requires 34 word accesses and subtraction operations instead of the 80 accesses and subtraction operations required to compare the entire 5×16 word array and thus achieves an 80/34 speed improvement. In the case of pattern 901 for two-pixel misaligned blocks, using the pattern requires 32 word accesses and 32 subtraction operations, achieving an 80/32 speed improvement. It should be pointed out here that because use of the patterns actually reduces the number of word access and subtraction operations that are performed when comparing two blocks 103, they reduce the time required to do a comparison even when used with processors that have narrower bus widths or that are not capable of performing operations on bytes in parallel.

Conclusion

The foregoing Detailed Description has disclosed to those skilled in the digital imaging arts how the amount of computation required for block comparison may be reduced by comparing only those pixels which belong to first elements that contain at least two contiguous pixels. If the pixels are contiguous in a horizontal direction relative to the images containing the blocks being compared, the block comparison is particularly sensitive to vertical detail. In a preferred embodiment of the techniques, the pattern is a checkerboard of aligned words. In one variation of the technique, the pattern includes pixels that do not belong to the blocks being compared; such pixels are ignored in the comparison. In another variation, the pattern includes less than all of the pixels of the blocks being compared and extra pattern elements are added to compensate for the missing pixels.

While the inventors have disclosed the best mode presently known to them of practicing their techniques, it will be immediately apparent to those skilled in the arts to which the invention pertains that there are many other patterns that employ the principles of the invention and that specific details of the patterns are dependent on the size of the words employed in the memory in which the blocks are stored and on the size of the words processed by the DSP employed in the preferred embodiment. For these reasons, the Detailed Description is to be regarded as being in all respects exemplary and not restrictive, and the breadth of the invention disclosed herein is to be determined not from the Detailed Description, but rather from the claims as interpreted with the full breadth permitted by the patent laws.

What is claimed is:

1. In a system including a processing unit, a memory, and a data bus connecting the processing unit and the memory, the system architecture defining, a word size, a method of comparing a first block of pixels with a second block of pixels, tile method comprising the steps of:

according to a fixed pattern that includes a plurality of elements, each of the elements including a number of pixels, the number of pixels corresponding to the word size, the pixels being contiguous in a horizontal direction, the plurality of elements comprising, first elements of a first element type in which pixels are to be compared and second elements of a second element type in which no pixels are to be compared, performing for each first element type in the pattern the steps of:

fetching a first element from the first block;

fetching the corresponding first element from the second block; and comparing pixels in the first element from the first block and corresponding pixels in the first element from the second block.

2. The method set forth in claim 1 wherein:

in the step of comparing the corresponding pixels, the pixels are compared in parallel.

3. The method set forth in claim 1 wherein:

the first element contains one or more pixels which do not belong to the first block; and in the step of comparing the corresponding pixels, the corresponding pixels are compared only if the pixels belong to the first block.

4. The method set forth in claim 1 wherein:

the pattern covers less than all of the pixels in the first block; and the pattern includes additional first elements to compensate for the pixels not covered by the pattern.

5. The method set forth in claim 1 wherein:

the pattern distributes the first elements evenly across the first block, and all the blocks use the same pattern.

6. The method set forth in claim 5 wherein:

the pattern is a checkerboard arrangement of the first elements and second elements.

7. A memory device for storing data, the memory device being characterized in that:

the data stored thereon includes a program which, when executed in a computer, causes the computer to perform the method set forth in any of claims 1, 2–6.

8. The method set forth in claim 1 wherein:

the first block of pixels and the second block of pixels are stored in a memory from which data is fetched in words; and all the first elements are word-aligned.

9. The method set forth in claim 8 wherein:

the first elements are words.

10. The method set forth in claim 9 wherein:

in the step of comparing corresponding pixels, the pixels in the words are compared in parallel.

11. The method set forth in claim 9 wherein:

one or more of the words in the first elements contain one or more pixels which do not belong to the first; and the corresponding pixels are compared only if the pixels belong to the first.

12. The method set forth in claim 9 wherein:

the pattern covers less than all of the pixels in the first block; and the pattern includes additional first elements to compensate for the pixels not covered by the pattern.

13. The method set forth in either of claims 11 or 12 wherein:

the block is not word-aligned.

14. The method set forth in any of claims 8, 9, 10–12 wherein:

the pattern distributes the first elements uniformly across the first block.

15. The method set forth in claim 14 wherein:

the second elements are also words; and the pattern is a checkerboard arrangement of the first elements and second elements.

16. The method set forth in claim 15 wherein:

the first block is not word aligned.

17. The method set forth in claim 15 wherein:

the words contain four pixels.

18. The method set forth in claim 17 wherein:

the words are 32-bit words; and each pixel contains 8 bits.

19. A memory device for storing data, the memory device being characterized in that:

the data stored thereon includes a program which, when executed in a computer, causes the computer to perform the method set forth in any of claims 8, 9, 10–12.

* * * * *

UNITED STATES PATENT AND TRADEMARK OFFICE
CERTIFICATE OF CORRECTION

PATENT NO : 6,016,163
DATED : JANUARY 18, 2000
INVENTOR(S) : RODRIGUEZ ET AL.

It is certified that error appears in the above-identified patent and that said Letters Patent is hereby corrected as shown below:

Column 2, Line 27, delete "101, and" and insert therefore - 101; and -
Column 3, Line 7, candidate blocks should be in italics
Column 6, Line 27, delete "305"
Column 8, Line 18, delete "end" and insert therefore - right -
Column 9, Line 63, delete "defining, a" and insert therefore - defining a -
Column 9, Line 65, delete "pixels, tile" and insert therefore - pixels, the -
Column 10, Line 3, delete "comprising, first" and insert therefore "comprising first"

Signed and Sealed this

Eighth Day of May, 2001

NICHOLAS P. GODICI

*Attest:*

*Attesting Officer*    Acting Director of the United States Patent and Trademark Office